(12) United States Patent
Benner et al.

(10) Patent No.: US 7,721,602 B2
(45) Date of Patent: May 25, 2010

(54) FILLING LEVEL SENSOR

(75) Inventors: Hans-Guenter Benner, Kriftel (DE); Bernd Pauer, Eppstein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/567,611

(22) PCT Filed: Aug. 5, 2005

(86) PCT No.: PCT/EP2005/053866

§ 371 (c)(1),
(2), (4) Date: May 29, 2007

(87) PCT Pub. No.: WO2006/027302

PCT Pub. Date: Mar. 16, 2006

(65) Prior Publication Data

US 2007/0256754 A1 Nov. 8, 2007

(30) Foreign Application Priority Data

Sep. 9, 2004 (DE) ........................ 10 2004 043 717

(51) Int. Cl.
*G01F 23/32* (2006.01)
(52) U.S. Cl. .......................... 73/317; 73/313
(58) Field of Classification Search .................. 73/317, 73/318

See application file for complete search history.

(56) References Cited

U.S. PATENT DOCUMENTS

| 4,385,942 A | 5/1983 | Tachikawa |
| 4,574,631 A | 3/1986 | Johnson, Jr. et al. |
| 4,635,480 A | 1/1987 | Hrncir et al. |
| 5,007,450 A | 4/1991 | Babb et al. |
| 5,522,415 A | 6/1996 | Hopenfeld |
| 5,765,435 A * | 6/1998 | Grotschel et al. ............. 73/313 |
| 6,089,086 A | 7/2000 | Swindler et al. |
| 6,599,096 B1 * | 7/2003 | Totten et al. ................. 417/133 |
| 2003/0159507 A1 | 8/2003 | Bergsma et al. |

FOREIGN PATENT DOCUMENTS

| EP | 0 932 031 A1 | 7/1999 |
| JP | 57-54260 | 3/1982 |
| JP | 58-137389 | 8/1983 |
| JP | 8-50045 | 2/1996 |
| JP | 11237274 A | 8/1999 |

OTHER PUBLICATIONS

English Machine Translation for JP 11-237274.*
Search Report dated Apr. 16, 2008 issued for the corresponding Japanese Patent Application No. 2006-519055.

* cited by examiner

*Primary Examiner*—Hezron Williams
*Assistant Examiner*—Mark Shabman
(74) *Attorney, Agent, or Firm*—Cohen Pontani Lieberman & Pavane LLP

(57) ABSTRACT

In the case of a filling level sensor (1) for detecting a fuel filling level in a fuel tank (2), a lever arm (7) which secures a float (6) has a guide part (14). The guide part (14) interacts with an installation opening (3) in the fuel tank (2) and deflects the lever arm (7) in a designated direction. This avoids the filling level sensor (1) being damaged during installation in the fuel tank (2).

15 Claims, 2 Drawing Sheets

FILLING LEVEL SENSOR

BACKGROUND OF THE INVENTION

The invention relates to a filling level sensor for detecting a fuel filling level in a fuel tank of a motor vehicle, with a lever arm which secures a float, follows the fuel filling level and has a support provided for installation in the fuel tank, and with a mounting of the lever arm on the support.

Filling level sensors of this type generally have a potentiometer arranged on the support or a magnetically passive position sensor for detecting the deflection of the lever arm, and are known from practice. In the case of fuel tanks nowadays which are generally very shallow and long, the lever arm is likewise very long. For installation, the filling level sensor is introduced with the float in front into the fuel tank through an installation opening which is kept very small. The support is subsequently fastened in the fuel tank. It is necessary in this case for the filling level sensor to be threaded through the installation opening into the fuel tank in a sufficiently careful manner, since the lever arm in particular can be damaged. Furthermore, when the filling level sensor is introduced into the fuel tank, the lever arm has to be pivoted in order to prevent the float from bumping against a wall of the fuel tank.

The invention is based on the problem of developing a filling level sensor of the type mentioned at the beginning in such a manner that it permits particularly simple installation in the fuel tank.

BRIEF DESCRIPTION OF THE INVENTION

This problem is solved according to the invention in that the lever arm has a guide part which protrudes laterally over the support and has a contour having a guide curve on its side facing away from the support.

This design makes it possible for the lever arm to be deflected by the guide part when the guide curve is pressed against the edge of the installation opening. The contour of the guide curve makes it possible to define the angle through which the lever arm is deflected as a function of the position of the filling level sensor according to the invention in relation to the fuel tank. The lever arm does not therefore need to be deflected by hand when the filling level sensor according to the invention is introduced into the fuel tank. The filling level sensor according to the invention therefore permits particularly simple installation in the fuel tank. The contour of the guide curve can be defined in a simple manner as a function of the shape and length of the lever arm and of the fuel tank.

In the case of fuel tanks and lever arms of the same shape, the guide part turns out to be structurally particularly simple, according to an advantageous development of the invention, if it has a curved edge pointing away from the support.

Particularly reliable guidance of the lever arm can be achieved if the filling level sensor slides on one side with an edge of the support and on the other side with the guide curve of the guide part along the edge of the installation opening. By this means, the filling level sensor according to the invention can be introduced straight into the fuel tank. In this case, the lever arm is automatically pivoted into the designated position. According to another advantageous development of the invention, such an automatic pivoting of the lever arm can be achieved in a simple manner if the support has an edge with a smooth contour on its side facing away from the guide part of the lever arm.

According to another advantageous development of the invention, existing filling level sensors can be retrofitted in a simple manner if the guide part has a latching connection on the lever arm.

The filling level sensor according to the invention can be manufactured particularly cost-effectively if the guide part is manufactured integrally with the lever arm.

The lever arm generally has a lever wire fastened to a plastic clip, the lever wire holding the float. The plastic clip has latching elements for connection to the lever wire. In the case of the known filling level sensors, the latching elements are frequently exposed to the risk of damage if they arrive against the edge of the installation opening during installation of the filling level sensor in the fuel tank. However, the risk of individual components of the filling level sensor according to the invention being damaged is further reduced if the lever arm has a plastic clip mounted on the support and a lever wire which is connected to the plastic clip and secures the float, and if the guide part is arranged on the plastic clip.

The installation of the filling level sensor according to the invention in the fuel tank is further simplified if the support or a component connected fixedly to the support is essentially the width of an installation opening in the fuel tank. The filling level sensor according to the invention is therefore guided by the support or the component connected to the support and the edge of the installation opening when it is introduced into the fuel tank. Since, however, the guide part protrudes over the support, the lever arm is deflected when the filling level sensor is introduced into the fuel tank.

The installation of the filling level sensor according to the invention is further simplified if the support is arranged on an installation flange designed for the closure of an installation opening of the fuel tank.

BRIEF DESCRIPTION OF THE DRAWINGS

The invention permits numerous embodiments. To further clarify its basic principle, one of these is illustrated in the drawing and is described below. In the drawing

FIG. 1 shows a filling level sensor 1 during installation in a fuel tank 2. The fuel tank 2 has an installation opening 3. The filling level sensor 1 has a support 5 fastened to an installation flange 4. In the fitted state, the installation flange 4 closes the installation opening 3 of the fuel tank 2, so that the filling level sensor 1 is situated within the fuel tank 2. The filling level sensor 1 has a lever arm 7 which supports a float 6 and is coupled to the support 5 via a mounting 8. The lever arm 7 has a plastic clip 9 to which a lever wire 10, which is connected to the float 6, is fastened via a latching connection 11. The position of the lever arm 7 is detected by a potentiometer 12. In this case, the lever arm 7 may secure, for example, a contact bridge (not illustrated) which interacts with slideways 13 arranged on the support 5. As an alternative, the position of the lever arm 7 may also be detected via a magnetically passive position sensor, with the lever arm 7 holding a magnet and a resistance network with spring tongues which can be deflected by the magnet being arranged on the support 5.

Figure 1:
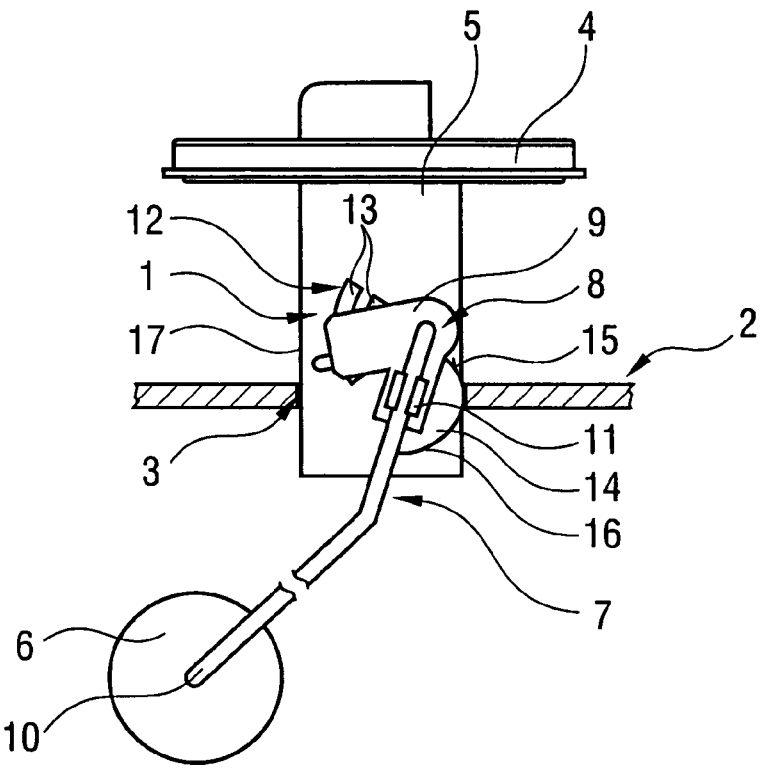
FIG. 1 shows a filling level sensor according to the invention during introduction into a fuel tank.

The plastic clip 9 has a guide part 14 which protrudes over the support 5 and has a guide curve 15. The guide curve 15 is arranged on an edge 16 pointing away from the support 5. On the side facing away from the guide part 14, the support 5 has an edge 17 with a smooth contour. For installation of the filling level sensor 1 in the fuel tank 2, first of all the float 6 is introduced through the installation opening 3 into the fuel tank 2. When the support 5 is subsequently introduced into the installation opening 3, the guide part 14 arrives against the boundary of the installation opening 3 and pivots the lever arm 7 in accordance with the contour of the guide curve 15. The position of the lever arm 7, at which the boundary of the installation opening 3 deflects the lever arm 7, is illustrated in FIG. 1.

Figure 2:
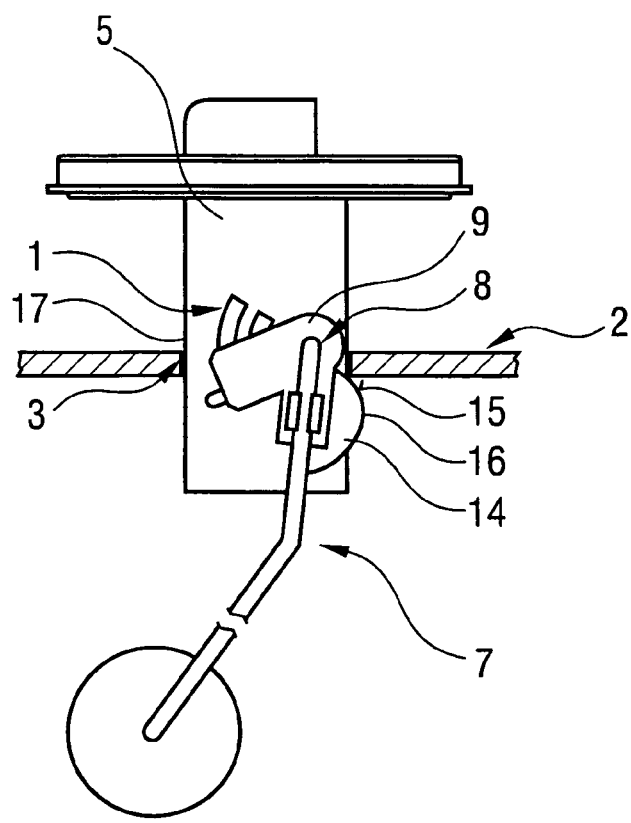
FIG. 2 shows the filling level sensor according to the invention from FIG. 1 in the state in which it is virtually completely introduced into the fuel tank.

As the filling level sensor 1 is introduced further, the guide part 14 passes out of the region of the installation opening 3, as illustrated in FIG. 2. This avoids the movement of the lever arm 7 being obstructed and therefore avoids the guide part 14 detecting the fuel filling level in the fuel tank 2.

Figure 3:
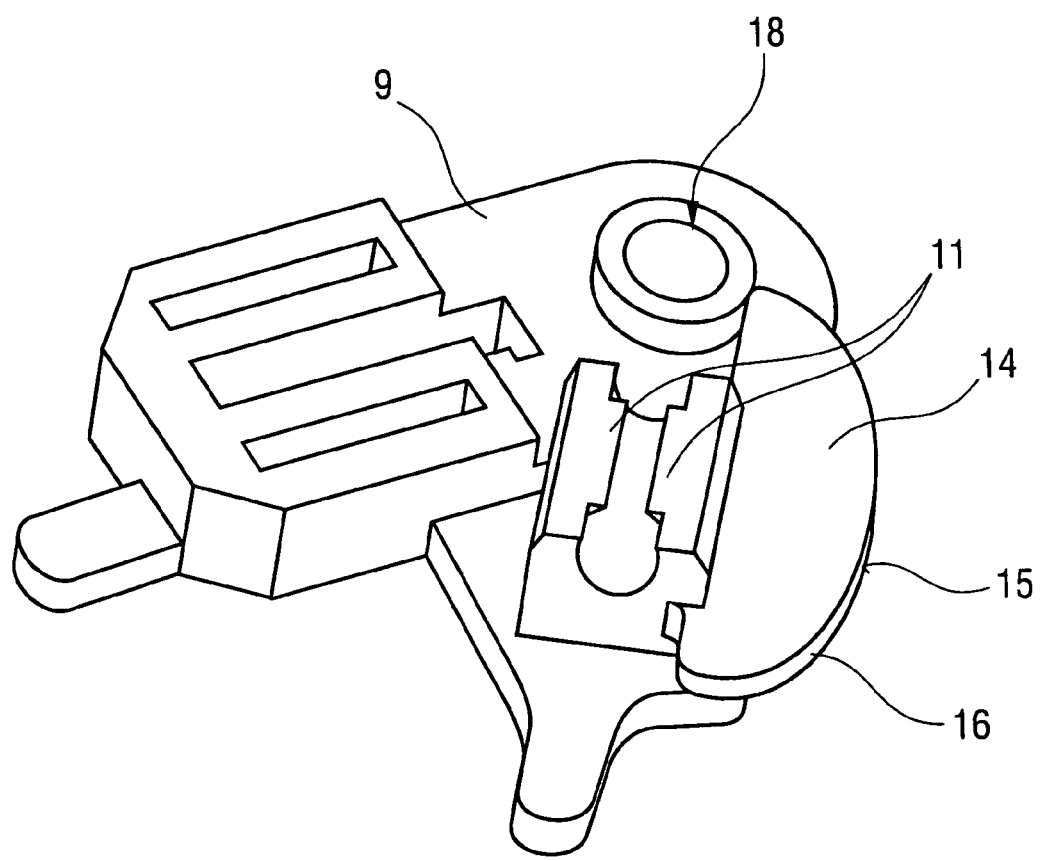
FIG. 3 shows, on a greatly enlarged scale, a perspective illustration of a plastic clip of the filling level sensor according to the invention from FIG. 1.

FIG. 3 shows, on an enlarged scale in a perspective illustration, the plastic clip 9 of the filling level sensor 1 from FIG. 1 with the guide part 14. It can be seen in this case that the guide part 14 is manufactured integrally with the plastic clip 9. The plastic clip 9 has a bearing hole 18 in the mounting 8, through which an angled end of the lever wire 10 illustrated in FIG. 1 is guided and forms the bearing spindle. The latching connection 11 for securing the lever wire 10 is likewise manufactured integrally with the plastic clip 9. In an embodiment (not illustrated), the guide part 14 may also have latching hooks and be latched to the plastic clip 9.

The invention claimed is:

1. A filling level sensor for detecting a fuel filling level in a fuel tank of a motor vehicle, where the fuel tank defines an installation opening through which the level sensor is inserted into the fuel tank, the filling level sensor comprising:
   a float;
   a lever arm coupled to the float that follows the fuel filling level, the lever arm comprising a plastic clip;
   a support provided for installation in the fuel tank, the plastic clip being coupled to the support; and
   wherein the plastic clip comprises a guide part which protrudes laterally beyond an edge of the support and includes a contour that includes a guide curve on a side of the guide part facing away from the support;
   wherein the installation opening has a diameter larger than the width of the support and less than the combination of the width of the support and the width of the guide part that protrudes laterally beyond the edge of the support; and
   wherein the lever arm is configured to pivot with the plastic clip when the guide curve contacts a boundary of the installation opening.

2. The filling level sensor as claimed in claim 1, wherein the guide curve is defined by a curved edge pointing away from the support.

3. The filling level sensor as claimed in claim 1, wherein the support includes an edge with a smooth contour on a side of the support facing away from the guide part of the lever arm.

4. The filling level sensor as claimed in claim 1, wherein the guide part includes a latching connection on the lever arm.

5. The filling level sensor as claimed in claim 1, wherein the guide part is manufactured integrally with the lever arm.

6. The filling level sensor as claimed in claim 1, wherein the lever arm includes a lever wire coupled to the plastic clip and the float.

7. The filling level sensor as claimed in claim 6, wherein the plastic clip comprises a mounting and a bearing hole in the mounting through which an angled end of the lever wire passes to form a bearing spindle.

8. The filling level sensor as claimed in claim 1, wherein the support or a component connected fixedly to the support is essentially the width of the installation opening in the fuel tank.

9. The filling level sensor as claimed in claim 8, further comprising an installation flange, and wherein the support is dependent from the installation flange which is configured for the closure of the installation opening in the fuel tank.

10. The filling level sensor as claimed in claim 1, further comprising a potentiometer configured for detecting the position of the lever arm.

11. The filling level sensor as claimed in claim 1, wherein the guide part is formed integrally with the plastic clip.

12. A filling level sensor for detecting a fuel filling level in a fuel tank of a motor vehicle, the fuel tank defining an installation opening through which the filling level sensor is inserted into the fuel tank, the filling level sensor comprising:
   a support inserted through the installation opening;
   a float;
   a lever arm coupled to the float that follows the fuel filling level, the lever arm comprising a plastic clip coupled to the support; and
   wherein the plastic clip comprises a guide part which protrudes laterally beyond a side of the support and includes a guide curve on a side of the guide part facing away from the support;
   wherein the installation opening has a diameter larger than the width of the support and less than the combination of the width of the support and the width of the guide part that protrudes laterally beyond the side of the support; and
   wherein the lever arm is configured to pivot with the plastic clip when the guide curve contacts a boundary of the installation opening as the support slides along another portion of the installation opening during installation of the support through the installation opening, whereby the filling level sensor can be introduced straight into the fuel tank during installation and the installation opening and the guide curve together define an angle through which the lever arm is pivoted as a function of the position of the filling level sensor in relation to the fuel tank during the installation.

13. The filling level sensor as claimed in claim 12, further comprising an installation flange connected to the support and closing the insertion opening when the support is fully inserted through the installation opening.

14. The filling level sensor as claimed in claim 12, wherein a contour of the guide curve is designed to pivot the plastic clip during the installation of the support through the installation opening until the guide part is substantially flush with the side of the support.

15. The filling level sensor as claimed in claim 12, wherein a contour of the guide curve is designed to pivot the plastic clip during the installation such that the float and lever arm avoid obstruction in the fuel tank during the installation.

* * * * *